April 23, 1963 R. H. WHITE 3,086,827
FLANGED RETAINER FOR ROLLER BEARINGS
Filed Jan. 26, 1961 2 Sheets-Sheet 1

ROBERT H. WHITE
INVENTOR

ATTORNEYS

April 23, 1963 R. H. WHITE 3,086,827
FLANGED RETAINER FOR ROLLER BEARINGS
Filed Jan. 26, 1961 2 Sheets-Sheet 2

ROBERT H. WHITE
*INVENTOR*

BY *Mason, Porter, Lilly & Stewart*

*ATTORNEYS.*

United States Patent Office 3,086,827
Patented Apr. 23, 1963

3,086,827
FLANGED RETAINER FOR ROLLER BEARINGS
Robert H. White, Torrington, Conn., assignor to The Torrington Company, Torrington, Conn., a corporation of Maine
Filed Jan. 26, 1961, Ser. No. 85,068
1 Claim. (Cl. 308—174)

The following specification is a disclosure of a novel flanged retainer for roller bearings. It is particularly adapted for the antifriction bearings on the cranks of crank shafts, for example where they support the connecting rod of a gas engine.

In the design of gas engines used in outboard motors for small vessels and in analogous places, the driven crankshaft is generally mounted on a vertical axis. Consequently the motor is a horizontal one having a horizontal connecting rod. Thus the connecting rod bears upon the crank shaft not only in the oscillatory manner by which the power is applied, but also there is a definite lateral thrust downwardly against one side of the crank. Such a bearing, therefore, has imposed upon it not only a radial thrust, but also an axial thrust. It is generally accepted that provision must be made, therefore, not only for an antifriction radial bearing, but also for a plain axial thrust bearing.

Rollers bearings are generally used for such radial bearings, but plain bearings suffice for meeting axial thrust.

In the development of this invention it has been found that the plain axial bearing or thrust bearing between the crank shaft and one crank is greatly improved by the selection of a material having a low coefficient of friction for the retainer or cage of the rollers and to provide a bearing between the side walls of the crank and the connecting rod bearing. This material can be of high strength and heat-resisting synthetic plastic, reinforced plastic, or light metals which lend themselves well to economic production of interchangeable parts for the retainer permitting its insertion in the connecting rod bearing around the crank pin despite the connection of the latter to the arms of the crank.

Such a design also permits the rollers to be arranged in pairs of retainer sections longitudinally disposed to each other, thus substituting two short rollers in place of one long roller with consequent freedom of movement between the rollers of each pair.

An object of the invention is to reduce the weight of the retainer, thus reducing the inertia and the centrifugal forces which have been found to be very severe on retainers in use with crank pins.

An object of the invention is to divide the rollers into two spaced series which can rotate at slightly different speeds where misaligning forces occur.

In the same manner the provision of rollers in two separate series spread apart, increases to the maximum, the stability under couple loads.

Among the objects of this invention is to design a retainer which can be produced inexpensively by a molding, sintering, or other operation in which all cavities for the rollers can be molded simultaneously in finished, precise shape.

One of the objects of the invention is to provide a retainer in which assembly is easy and economical, since the rollers are confined in one longitudinal direction and both inwardly and outwardly in the radial direction.

A still further object of the invention is to retain the rollers in narrow, cylindrical pockets which will insure their being held parallel to the axis of the crank pin.

In short, the improved retainer combines a plain thrust washer having low coefficient of friction with an accurately guiding portion with minimum frictional speed between the mating metallic surfaces and the thrust flange of the retainer.

The preferred form of the invention has been illustrated by way of example in the accompanying drawings in which.

Figure 1:
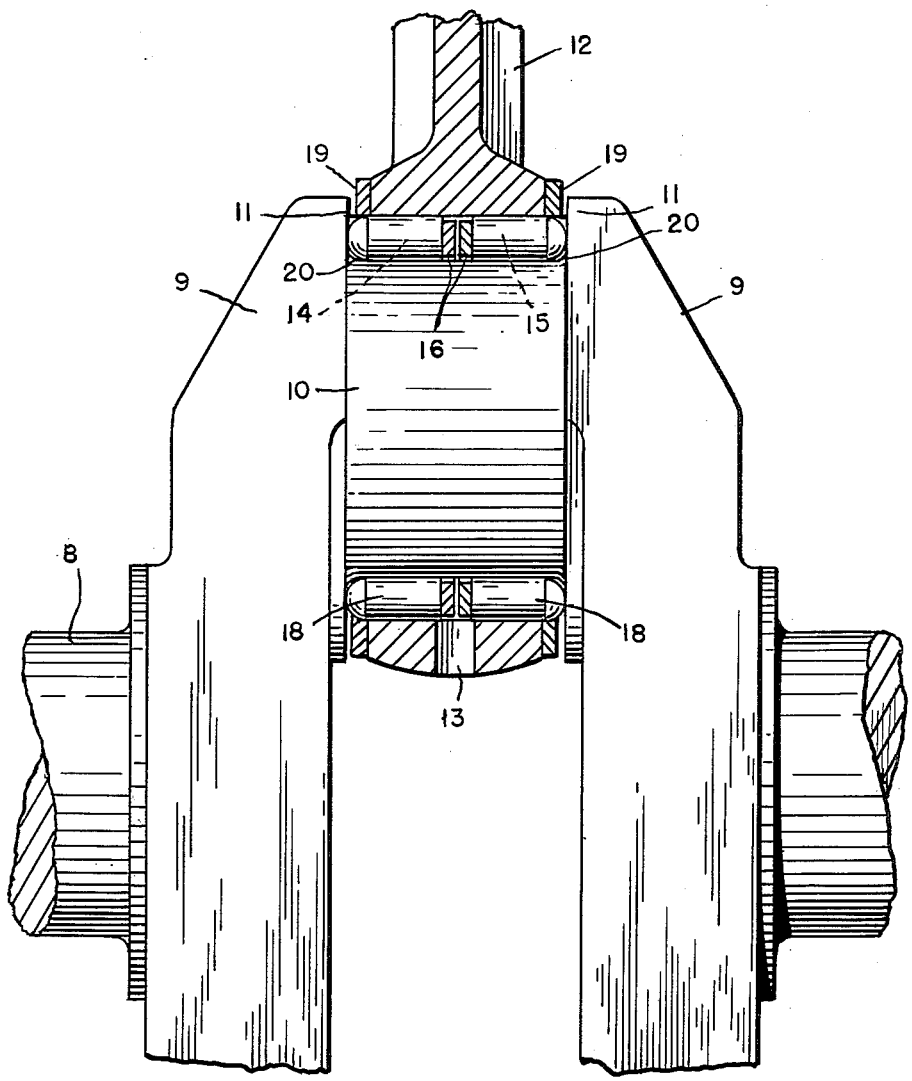
FIG. 1 is a fragmentary side view partly in section of a crank shaft and connecting rod equipped with the improved roller bearing.
Figure 3:
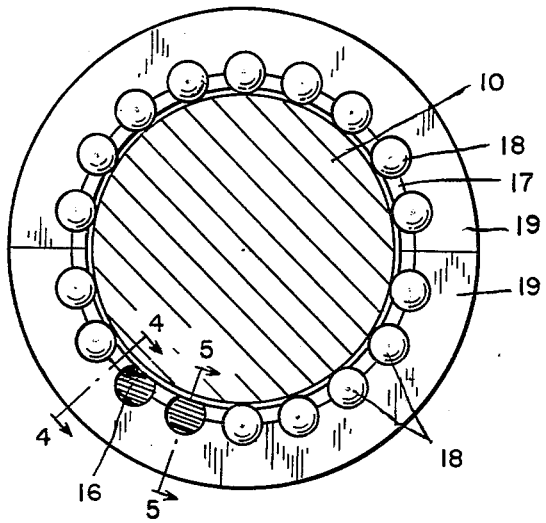
FIG. 3 is an end view of the bearing retainer shown in FIG. 2 with two rollers removed.

Briefly considered, the improved retainer consists of four interchangeable concave, part-cylindrical sections which are assembled to form two contiguous retaining members, each with its individual series of bearing rollers. The adjacent edges of the retainer sections are continuous ring section from which bars extend in opposite directions to form cylindrical pockets for individual bearing rollers. At the far end the bars are connected by radial flanges arranged over the bars to permit the individual rollers to be inserted axially at this point. This separating flange is caused to rotate orbitally by the travel of the rollers at a speed intermediate between the circular movements of the crank and the connecting rod bearing.

On the drawings the crank shaft 8 is shown to have parallel radial cranks 9, 9. These cranks are connected by the crank pin 10. At the junction of the cranks and crankpin, it is usual to have a fillet radius 20, 20 for strength purposes.

Cheek faces 11, 11 are provided on opposite sides of the cranks and form bearing surfaces.

The connecting rod 12 has a large split end which encompasses the crank 10. The outer end of the connecting rod is slotted in the usual manner, as shown at 13.

The complementary retainer assemblies or retainers 14 and 15, arranged side by side, occupy the space between the large end of the connecting rod 12 and the crank pin 10. This retainer is made of a molded lightweight, strong, heat-resistant and low frictional characteristic material. Any suitable plastic may be used for this purpose, of which nylon is an example as having suitable physical strength, smooth finish heat-resistance and low coefficiency of friction opposite the connecting rod and the cranks.

Each retainer is split into sections so that it may be applied in a continuous form around the crank pin despite the fact that the latter has no free end.

Each retainer has an inner continuous ring section 16. This ring has adequate clearance between the opposite surfaces of the connecting rod and the crank pin. The end rings 16 are slightly spaced apart.

A series of spaced transverse bars 17 extend axially from the ring 16. These bars have concave or cylindrically shaped side walls conforming in size and shape to the proportions of the bearing rollers 18 which are to be inserted. The rollers roll freely within the slots between the bars 17. Due to the concave walls of the bars, the rollers are prevented from radial dislodgment during handling of the retainer sections. It will be seen that each roller 18 has a relatively flat end bearing axially against the inner ring 16. In this way the roller is retained in this axial direction and both outwardly and inwardly in the radial direction.

The other ends of the bars 17 are connected by a flaring flange 19. This flange arches over the concavity between the adjacent ribs. The flanges extend radially and bear against the side wall of the connecting rod, so that a minimum of sliding friction is developed at this point.

It will be noted that the internal junction between the bars 17 and the flanges 19 have a chamfered or beveled edge.

Figure 2:
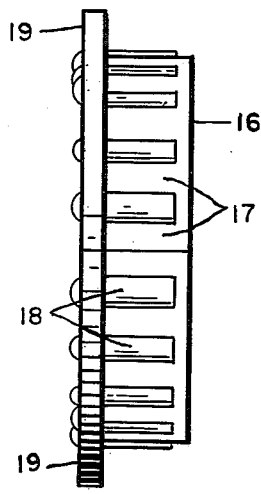
FIG. 2 is an end view of the bearing retainer.
Figure 4:
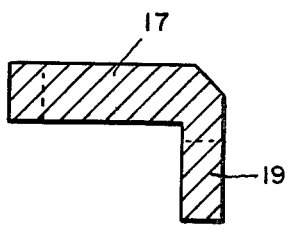
FIG. 4 is an enlarged cross-section of the retainer taken on the line 4—4 on FIG. 3
Figure 5:
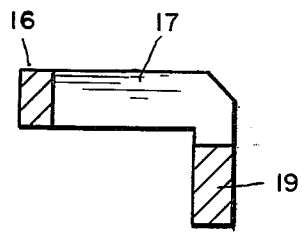
FIG. 5 is a similar sectional view of the retainer taken on the line 5—5 on FIG. 3.

The outer ends of the individual rollers 18 are tapered to a blunt point. This taper clears the fillet 20, 20 at the crankpin and radial crank junction. As shown on FIGURE 2, the blunt ends of the rollers 18 project axially beyond the outer face of the flange 19. This projection is a material and substantial factor in withstanding the end thrust against the adjacent cheeks of the cranks.

The bearing above particularly described can be molded or cast from certain suitable materials in a single operation and in final form without requiring finishing. Being in semicircular sections, each section can be filled with the individual rollers. The latter are confined against dislodgment except on the outward edge, where it is easy to control the movement. Such semicircular sections with the rollers can be slipped circumferentially over the crank pin on each side of the center plane of the connecting rod. The lower split end of the connecting rod can then be bolted in place. The retainer and roller assembly, the crankpin and cheeks, and the connecting rod and faces thus provide an antifriction radial roller bearing and a plain lateral thrust bearing. The character of the retainer provides an adequate extended bearing surface between the mating metal parts, of great durability and low friction.

Removal or replacement of one or more of the bearing sections can be easily carried out without disturbing other sections.

While the preferred form of the invention has been illustrated and described in detail, minor changes in material and proportions can be carried out without departing from the scope of the invention as defined in the following claim.

What I claim is:

A combined thrust and radial bearing comprising two complementary roller retaining units arranged side by side with adjacent closed ends, each unit being formed of concave, part-cylindrical sections having radially extending flanges at the opposite ends, and a series of parallel bars with opposed concave side walls extending through the flanged end to a plane near the opposite closed end and bearing rollers held in the spaces between the bars and projecting axially beyond the flange.

References Cited in the file of this patent

UNITED STATES PATENTS

| | | |
|---|---|---|
| 2,053,534 | Robinson | Sept. 8, 1936 |
| 2,665,958 | Waldherr | Jan. 12, 1954 |
| 2,696,411 | Kircher | Dec. 7, 1954 |

FOREIGN PATENTS

| | | |
|---|---|---|
| 668,351 | Germany | Dec. 1, 1938 |
| 1,145,720 | France | May 13, 1957 |